United States Patent
Fukaya

(10) Patent No.: US 11,302,936 B2
(45) Date of Patent: Apr. 12, 2022

(54) FUEL CELL COOLING SYSTEM WITH ELECTRICAL INSULATING COOLANT OR HEAT EXCHANGER STRUCTURED BY ELECTRICAL INSULATOR

(71) Applicant: Toyota Jidosha Kabushiki Kaisha, Toyota (JP)

(72) Inventor: Ryosuke Fukaya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 129 days.

(21) Appl. No.: 16/456,353

(22) Filed: Jun. 28, 2019

(65) Prior Publication Data
US 2020/0014042 A1    Jan. 9, 2020

(30) Foreign Application Priority Data
Jul. 3, 2018    (JP) .............................. JP2018-126949

(51) Int. Cl.
H01M 8/04029    (2016.01)
H01M 8/04007    (2016.01)

(52) U.S. Cl.
CPC ... *H01M 8/04029* (2013.01); *H01M 8/04074* (2013.01)

(58) Field of Classification Search
CPC ..................... H01M 8/04029; H01M 8/04074
USPC .................................. 429/436, 437, 438
See application file for complete search history.

(56) References Cited

U.S. PATENT DOCUMENTS

| | | | | |
|---|---|---|---|---|
| 6,448,535 | B1* | 9/2002 | Ap | B60L 58/34 219/208 |
| 6,569,550 | B2* | 5/2003 | Khelifa | B60H 1/143 429/434 |
| 2002/0031693 | A1* | 3/2002 | Ishikawa | H01M 8/04029 429/435 |
| 2002/0040896 | A1 | 4/2002 | Ap | |
| 2005/0095475 | A1* | 5/2005 | Breault | H01M 8/04029 429/438 |
| 2005/0238939 | A1* | 10/2005 | An | H01M 8/0271 429/423 |
| 2006/0051639 | A1* | 3/2006 | Yang | H01M 8/04029 429/437 |
| 2016/0006069 | A1* | 1/2016 | Gerhardt | H01M 8/2475 429/467 |

FOREIGN PATENT DOCUMENTS

FR    2805666 A1 *    8/2001 ......... B60H 1/00392
JP    2001-167778 A    6/2001
(Continued)

OTHER PUBLICATIONS

Myron L Company, Application Bulletin Deionized Water, 2017 (Year: 2017).*
MEGlobal, Ethylene Glycol Product Guide, 2013 (Year: 2013).*

*Primary Examiner* — Sean P Cullen
(74) *Attorney, Agent, or Firm* — Dinsmore & Shohl LLP

(57) ABSTRACT

There is provided a fuel cell cooling system that has: a first path through which an electrical insulating coolant, that cools a fuel cell, circulates; a second path through which a coolant, that exchanges heat with the electrical insulating coolant, circulates, and to which a radiator, that releases heat of the coolant, is connected; and a heat exchanger that carries out heat exchange between the first path and the second path.

8 Claims, 2 Drawing Sheets

(56) References Cited

FOREIGN PATENT DOCUMENTS

| | | |
|---|---|---|
| JP | 2002117884 A | 4/2002 |
| JP | 2003-217628 A | 7/2003 |
| JP | 2012-003944 A | 1/2012 |
| WO | WO-2014174295 A1 * 10/2014 | ............ H01M 8/188 |

* cited by examiner

FUEL CELL COOLING SYSTEM WITH ELECTRICAL INSULATING COOLANT OR HEAT EXCHANGER STRUCTURED BY ELECTRICAL INSULATOR

CROSS-REFERENCE TO RELATED APPLICATION

This application claims priority under 35 USC 119 from Japanese Patent Application No. 2018-126949 filed on Jul. 3, 2018, the disclosure of which is incorporated by reference herein.

BACKGROUND

Technical Field

The present disclosure relates to a fuel cell cooling system.

Related Art

There has conventionally been proposed a system in which two impellers, which rotate by liquid pressure that flows through a path of a cooling liquid that cools a fuel cell, are provided on the path, and, by making the interval between the distal ends of the respective impellers small, a path having a sectional surface area that is small locally is formed, and the electrical insulation resistance of the cooling liquid is ensured (see, for example, Japanese Patent Application Laid-Open (JP-A) No. 2002-117884).

However, if two impellers are provided on the path of the cooling liquid, the liquid flow resistance within the path increases. Accordingly, in order to ensure the flow rate of the cooling liquid within the path, a countermeasure such as increasing the output of a pump, or the like, is needed.

In this way, there is still room for improvement in a structure that ensures the electrical insulation resistance of a cooling liquid that cools a fuel cell (a structure that suppresses electric leakage from the fuel cell).

SUMMARY

Thus, an object of the present disclosure is to provide a fuel cell cooling system that can suppress electric leakage from a fuel cell.

In order to achieve the above-described object, a fuel cell cooling system of a first aspect of the present disclosure has: a first path through which an electrical insulating coolant, that cools a fuel cell, circulates; a second path through which a coolant, that exchanges heat with the electrical insulating coolant, circulates, and to which a radiator, that releases heat of the coolant, is connected; and a heat exchanger that carries out heat exchange between the first path and the second path.

In accordance with the first aspect of the present disclosure, the coolant that cools the fuel cell is an electrical insulating coolant. The first path, through which this electrical insulating coolant circulates, and the second path, through which a coolant, that exchanges heat with the electrical insulating coolant and is cooled by the radiator, circulates, are separate. Accordingly, electric leakage from the fuel cell via the first path is suppressed. Further, because there is no concern that the coolant of the second path will be charged, the electrical insulation resistance of the cooling system is ensured, even in a state in which the electrical insulation resistance at the second path is not ensured.

A fuel cell cooling system of a second aspect of the present disclosure has: a first path through which a first coolant, that cools a fuel cell, circulates; a second path through which a second coolant, that exchanges heat with the first coolant, circulates, and to which a radiator, that releases heat of the second coolant, is connected; and a heat exchanger that is structured by an electrical insulator, and that carries out heat exchange between the first path and the second path.

In accordance with the second aspect of the present disclosure, the first path, through which the first coolant that cools the fuel cell circulates, and the second path, through which the second coolant, which exchanges heat with the first coolant and is cooled by the radiator, circulates, are separate. Further, the heat exchanger, which carries out heat exchange between the first path through which the first coolant circulates and the second path through which the second coolant circulates, is structured by an electrical insulator. Accordingly, the second path is electrically insulated from the first path, and electric leakage from the fuel cell via the second path is suppressed.

Further, a fuel cell cooling system of a third aspect of the present disclosure is the fuel cell cooling system of the first aspect, wherein the heat exchanger is structured by an electrical insulator.

In accordance with the third aspect of the present disclosure, the heat exchanger, which carries out heat exchange between the first path through which the electrical insulating coolant circulates and the second path through which the coolant circulates, is structured by an electrical insulator. Accordingly, the second path is electrically insulated from the first path, and electric leakage from the fuel cell via the first path and the second path is suppressed.

A fuel cell cooling system of a fourth aspect of the present disclosure is the fuel cell cooling system of the second aspect, further including an electrical insulating cover that covers at least the first path.

In accordance with the fourth aspect of the present disclosure, the first path, through which the first coolant that cools the fuel cell circulates, is covered by an electrical insulating cover. Accordingly, electric shock that occurs due to the first path being contacted is prevented.

In accordance with the first aspect of the present disclosure, electric leakage from the fuel cell via the first path can be suppressed.

In accordance with the second aspect of the present disclosure, electric leakage from the fuel cell via the second path can be suppressed.

In accordance with the third aspect of the present disclosure, electric leakage from the fuel cell via the first path and the second path can be suppressed.

In accordance with the fourth aspect of the present disclosure, electric shock that occurs due to the first path being contacted can be prevented.

BRIEF DESCRIPTION OF THE DRAWINGS

Exemplary embodiments of the present disclosure will be described in detail based on the following figures, wherein.

DETAILED DESCRIPTION

Embodiments relating to the present disclosure are described in detail hereinafter on the basis of the drawings.

Note that cooling systems 10 of a fuel cell 14 relating to the present embodiments are installed in a vehicle. Further, hereinafter, there are cases in which the circulating direction upstream side of a coolant (including an electrical insulating coolant) is merely called the "upstream side", and the circulating direction downstream side is merely called the "downstream side". First, the cooling system 10 relating to a first embodiment is described.

First Embodiment

Figure 1:
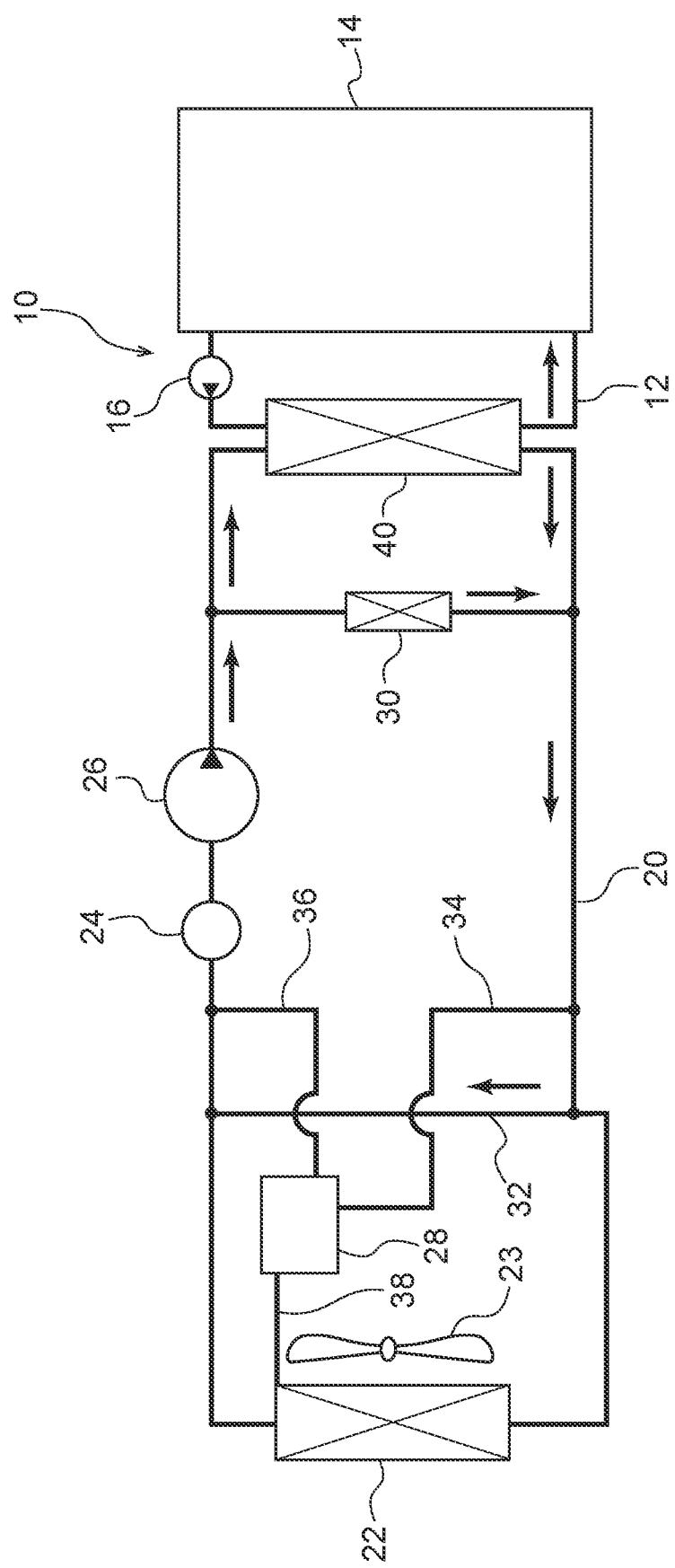
FIG. 1 is a schematic drawing showing a fuel cell cooling system relating to a first embodiment.

As shown in FIG. 1, the cooling system 10 relating to the present embodiment has a first path 12 that circulates an electrical insulating coolant that cools the interior of the fuel cell (an FC stack) 14, a second path 20 that circulates cooling liquid (Long Life Coolant: LLC) that serves as a coolant that is cooled by a radiator 22, and a heat exchanger 40 that carries out heat exchange between the first path 12 (the electrical insulating coolant that flows within the first path 12) and the second path 20 (the cooling liquid that flows within the second path 20).

A pump 16 for circulating the electrical insulating coolant is connected to the first path 12. The circulating path of the first path 12 is structured so as to be as short as possible. Note that what is called "electrical insulating coolant" here is a coolant (a liquid) having a volume resistivity of a given level or more (e.g., around $1.0 \times 10^{13}$ $\Omega \cdot m$), and a fluorine coolant such as FLUORINERT® that is a perfluorinated compound or the like is an example thereof. Further, a "volume resistivity of a given level or more" is because, in accordance with laws, electrical insulation resistance of greater than or equal to $100\Omega$ per 1 V (Volt) must be ensured at the vehicle on the whole, and is because the volume resistivity fluctuates depending on the electrical insulation resistances of other regions.

The radiator 22 that releases the heat of the cooling liquid to the atmosphere, a temperature sensor 24 that detects the temperature of the cooling liquid, and a pump 26 for circulating the cooling liquid, are connected to the second path 20 in that order from the upstream side toward the downstream side. Note that a fan 23 for blowing cooling air toward the radiator 22 is disposed so as to face the radiator 22.

Further, illustration of respective electromagnetic switching valves at the regions of connection with the second path 20 is omitted in FIG. 1. The portion of the second path 20, which portion is further toward the downstream side than the radiator 22 and is further toward the upstream side than the temperature sensor 24, and the portion of the second path 20 which is further toward the upstream side than the radiator 22, are connected by a bypass 32.

Further, the portion of the second path 20, which portion is further toward the upstream side than the region where the upstream side of the bypass 32 is connected, and a reservoir tank 28 are connected by a first branch path 34. The portion of the second path 20, which is further toward the downstream side than the region where the downstream side of the bypass 32 is connected and which is further toward the upstream side than the temperature sensor 24, and the reservoir tank 28 are connected by a second branch path 36. Moreover, the radiator 22 and the reservoir tank 28 are connected by a third branch path 38.

An inter-cooler 30 is connected between the portion of the second path 20 that is further toward the downstream side than the pump 26, and the portion of the second path 20 that is further toward the upstream side than the region where the first branch path 34 is connected. (The inter-cooler 30 is connected in parallel with the radiator 22 and the heat exchanger 40 that is described later.) This inter-cooler 30 is a heat exchanger that carries out heat exchange with air whose temperature has been raised by compression of an unillustrated supercharger, and that cools this air.

Further, the heat exchanger 40 is connected the portion of the second path 20, which portion is further toward the downstream side than the region where the upstream side of the inter-cooler 30 is connected, and the portion of the second path 20, which portion is further toward the upstream side than the region where the downstream side of the inter-cooler 30 is connected. (The heat exchanger 40 is connected so as to be connected in series to the radiator 22.) The heat exchanger 40 is also connected to the first path 12 at further toward the downstream side than the pump 16. The heat exchanger 40 carries out heat exchange between the heat of the electrical insulating coolant that circulates within the first path 12 and the heat of the cooling liquid that circulates within the second path 20, and cools the electrical insulating coolant by the cooling liquid.

Note that the heat, which is taken by the heat exchanger 40 from the electrical insulating coolant that circulates within the first path 12, is transported to the radiator 22 by the cooling liquid that circulates within the second path 20, and is released into the atmosphere by the radiator 22. Namely, heat exchange is carried out between the heat of the cooling liquid that flows through the radiator 22 and the heat of the cooling air that is blown toward the radiator 22. Then, the cooling liquid, which has been cooled by having undergone heat exchange at the radiator 22, is sent again to the heat exchanger 40.

Operation of the cooling system 10, which relates to the first embodiment and is structured as described above, is described next.

At the first path 12, the electrical insulating coolant circulates due the driving of the pump 16. The electrical insulating coolant, which passes-through the fuel cell 14 and exchanges heat with the fuel cell 14 (is heated by the fuel cell 14), passes-through the heat exchanger 40, and, due thereto, exchanges heat with the cooling liquid that circulates through the second path 20 (the electrical insulating coolant is cooled). Note that the electrical insulating coolant that has undergone this heat exchange (has been cooled) again passes-through the fuel cell 14, and exchanges heat with the fuel cell 14 (is heated at the fuel cell 14).

At the second path 20, the cooling liquid is circulated by the driving of the pump 26. The cooling liquid, that has exchanged heat with the electrical insulating coolant at the heat exchanger 40, passes-through the radiator 22, and, due thereto, exchanges heat with the cooling air that is blown toward the radiator 22. Namely, the heat of the cooling liquid is released to the atmosphere, and the cooling liquid is cooled. Note that the cooling liquid that has undergone this heat exchange (has been cooled) again passes-through the heat exchanger 40, and exchanges heat with the electrical insulating coolant that circulates through the first path 12.

The fuel cell 14 is cooled in this way. At this cooling system 10, the first path 12, through which the electrical insulating coolant that cools the fuel cell 14 circulates, and the second path 20, through which the cooling liquid, which exchanges heat with the electrical insulating coolant and is cooled by the radiator 22, circulates, are separate. Further, the coolant, which circulates through the first path 12 and cools the fuel cell 14, is an electrical insulating coolant having a volume resistivity of a given level or more.

Accordingly, electric leakage from the fuel cell 14 via the first path 12 can be suppressed or prevented. Further, because there is no concern that the cooling liquid of the second path 20 will be charged (high voltage will be applied to the cooling liquid), the electrical insulation resistance of the cooling system 10 (the entire vehicle) can be ensured even in a state in which the electrical insulation resistance at the second path 20 is not ensured. Namely, there is no concern that a user will receive an electric shock even if the user mistakenly contacts the first path 12 or the second path 20.

Note that the specific heat of the electrical insulating coolant is lower than that of water, and the performance of the electrical insulating coolant as a coolant is worse. However, because the circulating path of the first path 12 is short, the liquid flow resistance is low, and the appropriate flow rate can be ensured even if the capacity of the pump 16 is not high (even if the capacity of the pump 16 is a usual capacity). Further, although the circulating path of the second path 20 is long, only the radiator 22 and the heat exchanger 40 and the like are provided thereon (the liquid flow resistance is not high), and therefore, it suffices for the capacity of the pump 26 to be a usual capacity, and the heat radiating ability at the radiator 22 can be ensured sufficiently.

Moreover, as described above, there is no concern that the cooling liquid of the second path 20 will be changed (that high voltage will be applied to the cooling liquid). Therefore, at the second path 20, management of the electrical insulation resistance is unnecessary. Namely, at the second path 20, there is no need to provide an ion exchanger that removes ions that are a cause of an increase in the electrical conductivity of the cooling liquid. Accordingly, the manufacturing cost of the vehicle can be reduced.

Further, only the cooling liquid (LLC) circulates through the second path 20, and the electrical insulating coolant does not contain additives such as a rust preventive agent or the like (ionic compounds that lower the electrical insulation resistance). Therefore, the load on the radiator 22 is low (the occurrence of corrosion at the radiator 22 is suppressed), and the lifespan of the radiator 22 can be extended. Moreover, because the cooling liquid (LLC) is inexpensive and is colored, it is easily differentiated from the electrical insulating coolant that is expensive, colorless and transparent, and the work of replacing the cooling liquid also can be carried out easily.

Second Embodiment

The cooling system 10 relating to a second embodiment is described next. Note that portions that are equivalent to those of the above-described first embodiment are denoted by the same reference numerals, and detailed description thereof (including description of operations common thereto) is omitted as appropriate.

Figure 2:
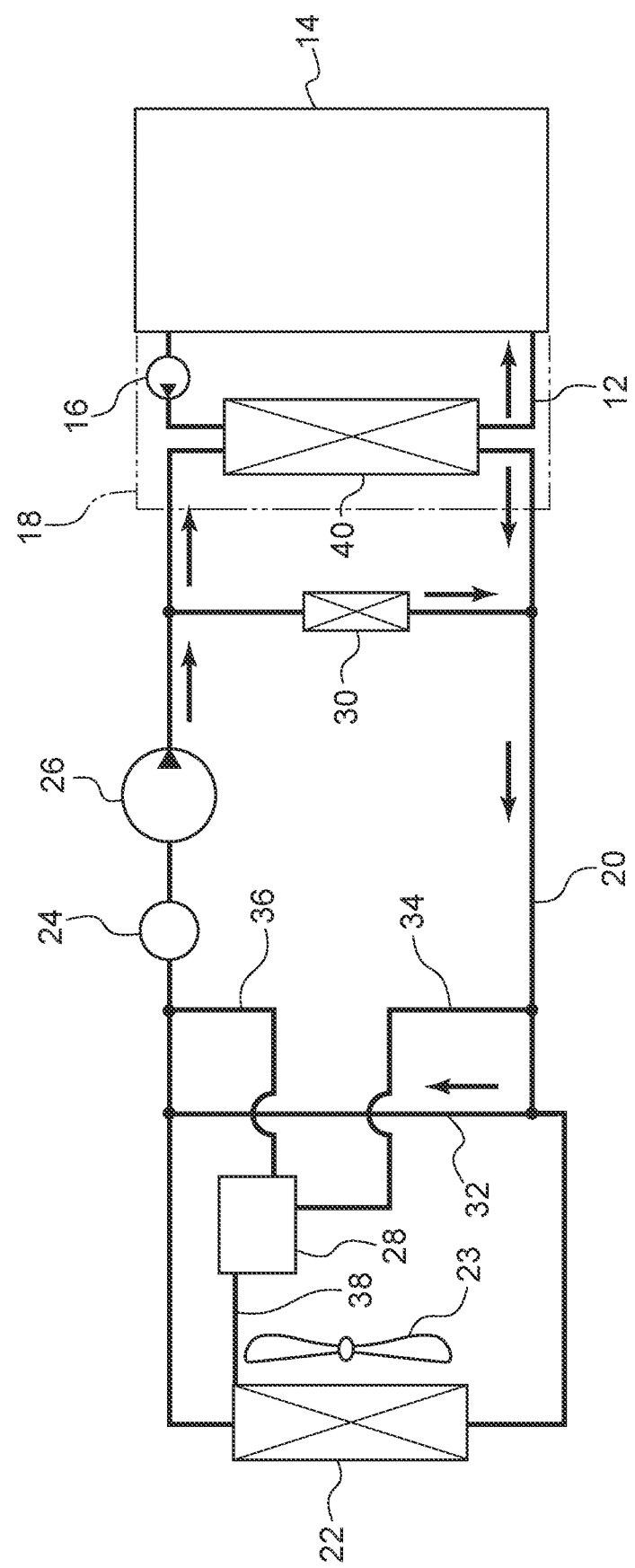
FIG. 2 is a schematic drawing showing a fuel cell cooling system relating to a second embodiment.

The second embodiment differs from the above-described first embodiment with regard to the point that a first coolant that circulates through the first path 12 is not an electrical insulating coolant and is a first cooling liquid (LLC) that is the same as a second cooling liquid (LLC) that serves as a second coolant that circulates through the second path 20, and the point that the heat exchanger 40 is structured by an electrical insulator. Further, the second embodiment differs from the above-described first embodiment with regard to the point that the first path 12 and the heat exchanger 40 are covered by an electrical insulating cover 18 as shown in FIG. 2.

The heat exchanger 40 is structured by an electrical insulating material (an electrical insulator) having a volume resistivity of a given level or more. For example, silicon carbide and silicon nitride ceramic materials are examples of the electrical insulating material. Further, also in the cooling system 10 relating to the second embodiment, the electrical insulation resistance of the heat exchanger 40 is set such that an electrical insulation resistance of greater than or equal to 100Ω per 1 V is ensured at the vehicle on the whole.

The electrical insulating cover 18 is for preventing a user mistakenly contacting the first path 12, i.e., is for preventing electric shock, and is formed in the shape of a case that can accommodate the first path 12 and the heat exchanger 40 therein. Note that it suffices for the electrical insulating cover 18 to cover at least the first path 12 because, as described above, the electrical insulating cover 18 is for preventing the user contacting the first path 12.

Operation of the cooling system 10, which relates to the second embodiment and is structured as described above, is described next.

At the first path 12, the first cooling liquid (LLC) circulates due to the driving of the pump 16. Due to the first cooling liquid, which passes-through the fuel cell 14 and exchanges heat with the fuel cell 14 (is heated at the fuel cell 14), passing-through the heat exchanger 40, the first cooling liquid exchanges heat with the second cooling liquid that circulates through the second path 20 (the first cooling liquid is cooled). Note that the first cooling liquid that has undergone heat exchange (that has been cooled) again passes-through the fuel cell 14, and exchanges heat with the fuel cell 14 (is heated by the fuel cell 14).

At the second path 20, the second cooling liquid (LLC) circulates due to driving of the pump 26. Due to the second cooling liquid, that has exchanged heat with the first cooling liquid at the heat exchanger 40, passing-through the radiator 22, the second cooling liquid exchanges heat with the cooling air that is blown toward the radiator 22. Namely, the heat of the second cooling liquid is released to the atmosphere, and the second cooling liquid is cooled. Note that the second cooling liquid that has undergone heat exchange (has been cooled) again passes-through the heat exchanger 40, and exchanges heat with the first cooling liquid that circulates through the first path 12.

The fuel cell 14 is cooled as described above. At this cooling system 10, the first path 12, through which the first cooling liquid that cools the fuel cell 14 circulates, and the second path 20, through which the cooling liquid, which exchanges heat with the first cooling liquid and is cooled by the radiator 22, circulates, are separate. Further, the heat exchanger 40, which carries out heat exchange between the first path 12 through which the first cooling liquid circulates and the second path 20 through which the second cooling liquid circulates, is structured by an electrical insulator (an electrical insulating material).

Accordingly, even if the first coolant that circulates through the first path 12 is not an electrical insulating coolant, the second path 20 can be electrically insulated from the first path 12 (a high voltage system), and electric leakage from the fuel cell 14 via the second path 20 can be suppressed. Further, because at least the first path 12 is covered by the electrical insulating cover 18, there is no concern that a user will mistakenly contact the first path 12. Namely, there is no concern that a user will contact the first path 12 and receive an electric shock.

Further, the first cooling liquid (LLC), and not an electrical insulating coolant, is used as the first coolant that circulates through the first path 12. Therefore, the performance as a coolant that cools the fuel cell 14 does not deteriorate. Accordingly, heat can be transmitted well from the fuel cell 14 to the first cooling liquid (the fuel cell 14 can be cooled well).

Further, the thermal conductivity of the electrical insulating material is low as compared with that of a metal material. When the heat exchanger 40 that is structured by an electrical insulating material is compared with a heat exchanger (not illustrated) that is formed of a metal material, the heat transfer efficiency is lower. However, because the heat exchange at the heat exchanger 40 is the exchange of heat between liquids (the cooling liquids), it is easy to ensure the heat transfer efficiency as compared with the radiator 22 that carries out heat exchange between a liquid and a gas.

Note that, as shown in FIG. 2, in a case in which the heat exchanger 40 is set at a position that is relatively close to the fuel cell 14, there may be the electrical insulating cover 18 that covers not only the first path 12 and the heat exchanger 40, but also the fuel cell 14. Due thereto, the first path 12, the heat exchanger 40 and the fuel cell 14 can be handled as one module that is built into the case-shaped electrical insulating cover 18.

Further, in the second embodiment, the electrical insulating cover may be eliminated, and the first coolant that circulates through the first path 12 may be made to be an electrical insulating coolant in the same way as in the first embodiment, and not the first cooling liquid. In other words, in the first embodiment, the heat exchanger 40 may be structured by an electrical insulator (an electrical insulating material) in the same way as in the second embodiment.

By forming such a structure, the electrical insulation resistance at the second path 20 can be ensured (the electrical insulation resistance of the cooling system 10 can be ensured), and electric leakage from the fuel cell 14 via the first path 12 and the second path 20 can be suppressed or prevented even more. Accordingly, there is no concern that a user will receive an electric shock even if the user mistakenly contacts the first path 12 or the second path 20.

Further, the electrical insulation resistance at the cooling system 10 in this case is the total of the volume resistivity of the electrical insulating coolant and the volume resistivity of the heat exchanger 40 that is structured by an electrical insulator (an electrical insulating material). Here, it suffices for the electrical insulation resistance of the entire vehicle to be ensured to be greater than or equal to 100Ω per 1 V. Accordingly, the volume resistivity of the electrical insulating coolant can be made to be lower than the volume resistivity of the electrical insulating coolant in the above-described first embodiment, and the volume resistivity of the heat exchanger 40 can be made to be lower than the volume resistivity of the heat exchanger 40 in the above-described second embodiment.

The cooling systems 10 of the fuel cell 14 relating to the present embodiments have been described above on the basis of the drawings. However, the cooling systems 10 relating to the present embodiments are not limited to the illustrated structures, and the designs thereof can be changed appropriately within a scope that does not depart from the gist of the present disclosure. For example, the electrical insulating cover 18 is not limited to a structure that is formed in the shape of a case. Further, the pump 16 that is provided on the first path 12 may be provided at the downstream side, and not at the upstream side, of the heat exchanger 40.

What is claimed is:

1. A fuel cell cooling system comprising:
   a first path through which an electrical insulating coolant, that cools a fuel cell, circulates;
   a second path through which a coolant, that exchanges heat with the electrical insulating coolant, circulates, and to which a radiator, that releases heat of the coolant, is connected;
   a bypass connecting a first portion of the second path that is adjacent to an inlet of the radiator and a second portion of the second path that is adjacent to an outlet of the radiator;
   a reservoir tank connected to the second path via a first branch path and a second branch path and connected to the radiator via a third branch path, wherein the first branch path is connected to the first portion and the second branch path is connected to the second portion, and the first branch path and the second branch path are connected in parallel with the bypass; and
   a heat exchanger that carries out heat exchange between the first path and the second path,
   wherein a volume resistivity of the electrical insulating coolant is greater than a volume resistivity of the coolant, and
   a circulating path of the first path is shorter than a circulating path of the second path.

2. The fuel cell cooling system of claim 1, wherein the volume resistivity of the electrical insulating coolant is greater than about $1.0 \times 10^{13}$ Ω·m.

3. The fuel cell cooling system of claim 1, wherein the electrical insulating coolant is colorless and the coolant is colored.

4. The fuel cell cooling system of claim 1, further comprising:
   an inter-cooler connected in parallel with the radiator and the heat exchanger.

5. The fuel cell cooling system of claim 1, further comprising an electrical insulating cover that covers the heat exchanger, an entirety of the first path, and the fuel cell.

6. A fuel cell cooling system comprising:
   a first path through which a first coolant, that cools a fuel cell, circulates;
   a second path through which a second coolant, that exchanges heat with the first coolant, circulates, and to which a radiator, that releases heat of the second coolant, is connected;
   a bypass connecting a first portion of the second path that is adjacent to an inlet of the radiator and a second portion of the second path that is adjacent to an outlet of the radiator;
   a reservoir tank connected to the second path via a first branch path and a second branch path and connected to the radiator via a third branch path, wherein the first branch path is connected to the first portion and the second branch path is connected to the second portion, and the first branch path and the second branch path are connected in parallel with the bypass; and
   a heat exchanger that carries out heat exchange between the first path and the second path,
   wherein a volume resistivity of the first coolant is greater than a volume resistivity of the second coolant, and
   a circulating path of the first path is shorter than a circulating path of the second path.

7. The fuel cell cooling system of claim 6, further comprising:
   an inter-cooler connected in parallel with the radiator and the heat exchanger.

8. The fuel cell cooling system of claim 6, further comprising an electrical insulating cover that covers the heat exchanger, an entirety of the first path, and the fuel cell.

* * * * *